(12) United States Patent
Atkinson et al.

(10) Patent No.: US 11,819,716 B2
(45) Date of Patent: Nov. 21, 2023

(54) CONTAINMENT SYSTEM FOR HAZARDOUS PRODUCTS

(71) Applicant: E-CELL Secure, L.L.C., Detroit, MI (US)

(72) Inventors: Dennis Atkinson, Ferndale, MI (US); Ronald Butler, West Bloomfield, MI (US)

(73) Assignee: e-cell secure, LLC, Detroit, MI (US)

( * ) Notice: Subject to any disclaimer, the term of this patent is extended or adjusted under 35 U.S.C. 154(b) by 0 days.

(21) Appl. No.: 17/557,553

(22) Filed: Dec. 21, 2021

(65) Prior Publication Data

US 2022/0111238 A1   Apr. 14, 2022

Related U.S. Application Data

(63) Continuation of application No. 16/682,760, filed on Nov. 13, 2019, now Pat. No. 11,224,772.

(60) Provisional application No. 62/760,573, filed on Nov. 13, 2018.

(51) Int. Cl.
| | | |
|---|---|---|
| *A62C 2/00* | (2006.01) | |
| *A62C 2/06* | (2006.01) | |
| *G08B 21/18* | (2006.01) | |
| *G08B 7/06* | (2006.01) | |
| *A62C 37/08* | (2006.01) | |
| *A62C 3/16* | (2006.01) | |
| *A62C 37/36* | (2006.01) | |
| *H02J 7/00* | (2006.01) | |
| *A62C 37/44* | (2006.01) | |
| *A62C 35/10* | (2006.01) | |
| *A62C 3/00* | (2006.01) | |

(52) U.S. Cl.
CPC ............... *A62C 2/065* (2013.01); *A62C 3/16* (2013.01); *A62C 35/10* (2013.01); *A62C 37/04* (2013.01); *A62C 37/08* (2013.01); *A62C 37/44* (2013.01); *G08B 7/06* (2013.01); *G08B 21/182* (2013.01); *H02J 7/0042* (2013.01); *A62C 3/002* (2013.01); *A62C 3/14* (2013.01)

(58) Field of Classification Search
CPC .......... A62C 2/065; A62C 3/16; A62C 35/10; A62C 37/04; A62C 37/08; A62C 37/44; A62C 3/14; A62C 2/06; G08B 7/06; G08B 21/182; H02J 7/0042
See application file for complete search history.

(56) References Cited

U.S. PATENT DOCUMENTS

| | | |
|---|---|---|
| 5,016,715 A | 5/1991 | Alasio |
| 5,056,603 A | 10/1991 | Parkinson |
| 5,651,821 A | 7/1997 | Uchida |
| 5,990,789 A | 11/1999 | Berman et al. |
| 6,660,972 B1 | 12/2003 | Georgii |
| 6,981,555 B2 | 1/2006 | Smith et al. |
| 7,820,319 B2 | 10/2010 | Mehta et al. |
| 8,733,465 B1 | 5/2014 | Flood et al. |
| 8,863,856 B2 | 10/2014 | Eckholm et al. |
| 9,180,324 B2 | 11/2015 | Burkett |

(Continued)

*Primary Examiner* — Ojiako K Nwugo
(74) *Attorney, Agent, or Firm* — Bodman PLC

(57) ABSTRACT

A system for storing a hazardous product including a housing unit defining a product opening and a product door coupled to the housing unit adjacent to the product opening, wherein the product door is configured to form a seal with the housing unit about the product opening in response to a thermal event.

20 Claims, 10 Drawing Sheets

(56) References Cited

U.S. PATENT DOCUMENTS

| | | |
|---|---|---|
| 9,233,264 B2 | 1/2016 | Graham et al. |
| 9,248,917 B2 | 2/2016 | Gastonides et al. |
| 9,345,916 B1 | 5/2016 | Kirkbride |
| 9,415,248 B2 | 8/2016 | Donahue |
| 9,539,448 B2 | 1/2017 | Jung et al. |
| 9,586,067 B1 | 3/2017 | Kirkbride |
| 11,380,943 B2 | 7/2022 | Wedig et al. |
| 2005/0057344 A1* | 3/2005 | Davis ................. G08G 1/205 340/425.5 |
| 2005/0103391 A1* | 5/2005 | Harvey ................ B60P 3/227 137/899 |
| 2006/0113302 A1 | 6/2006 | Mandava et al. |
| 2009/0014188 A1 | 1/2009 | Hesch et al. |
| 2010/0075213 A1 | 3/2010 | Mehta et al. |
| 2010/0086844 A1 | 4/2010 | Mehta et al. |
| 2010/0273034 A1 | 10/2010 | Hermann et al. |
| 2011/0234058 A1* | 9/2011 | Lee ...................... G21F 7/00 312/31.1 |
| 2012/0039694 A1* | 2/2012 | Suzanne ................. E04H 5/02 414/339 |
| 2012/0308859 A1 | 12/2012 | Hermann et al. |
| 2012/0318921 A1 | 12/2012 | Rohrbach et al. |
| 2013/0087570 A1* | 4/2013 | Ekhtiar ................. G01M 3/34 73/40.5 R |
| 2013/0316198 A1 | 11/2013 | Bandhauer et al. |
| 2014/0186668 A1 | 7/2014 | Jung et al. |
| 2014/0209331 A1* | 7/2014 | Burkett ................. A62C 35/02 169/46 |
| 2015/0017491 A1 | 1/2015 | Specht et al. |
| 2015/0147602 A1 | 5/2015 | Bianchi et al. |
| 2015/0203734 A1 | 7/2015 | Kanae et al. |
| 2016/0059056 A1 | 3/2016 | Hoffman |
| 2016/0176622 A1 | 6/2016 | Vertsteylen et al. |
| 2016/0339281 A1 | 11/2016 | Muenzenberger |
| 2017/0077467 A1 | 3/2017 | Kronke et al. |
| 2017/0120090 A1 | 5/2017 | Magnone et al. |
| 2017/0237054 A1 | 8/2017 | Mast |
| 2017/0335587 A1* | 11/2017 | Prendergast ............ E04H 1/125 |
| 2017/0361139 A1 | 12/2017 | Koreis et al. |
| 2018/0026245 A1 | 1/2018 | Page et al. |
| 2019/0044326 A1 | 2/2019 | Williams et al. |
| 2019/0046935 A1* | 2/2019 | Schwartz ................ B01F 21/22 |
| 2019/0344109 A1 | 11/2019 | Enk |
| 2020/0005956 A1* | 1/2020 | Pennington ............ G21F 5/015 |
| 2021/0194072 A1 | 6/2021 | Krois et al. |
| 2021/0379428 A1 | 12/2021 | Tsutsui et al. |
| 2022/0158277 A1 | 5/2022 | Park et al. |

\* cited by examiner

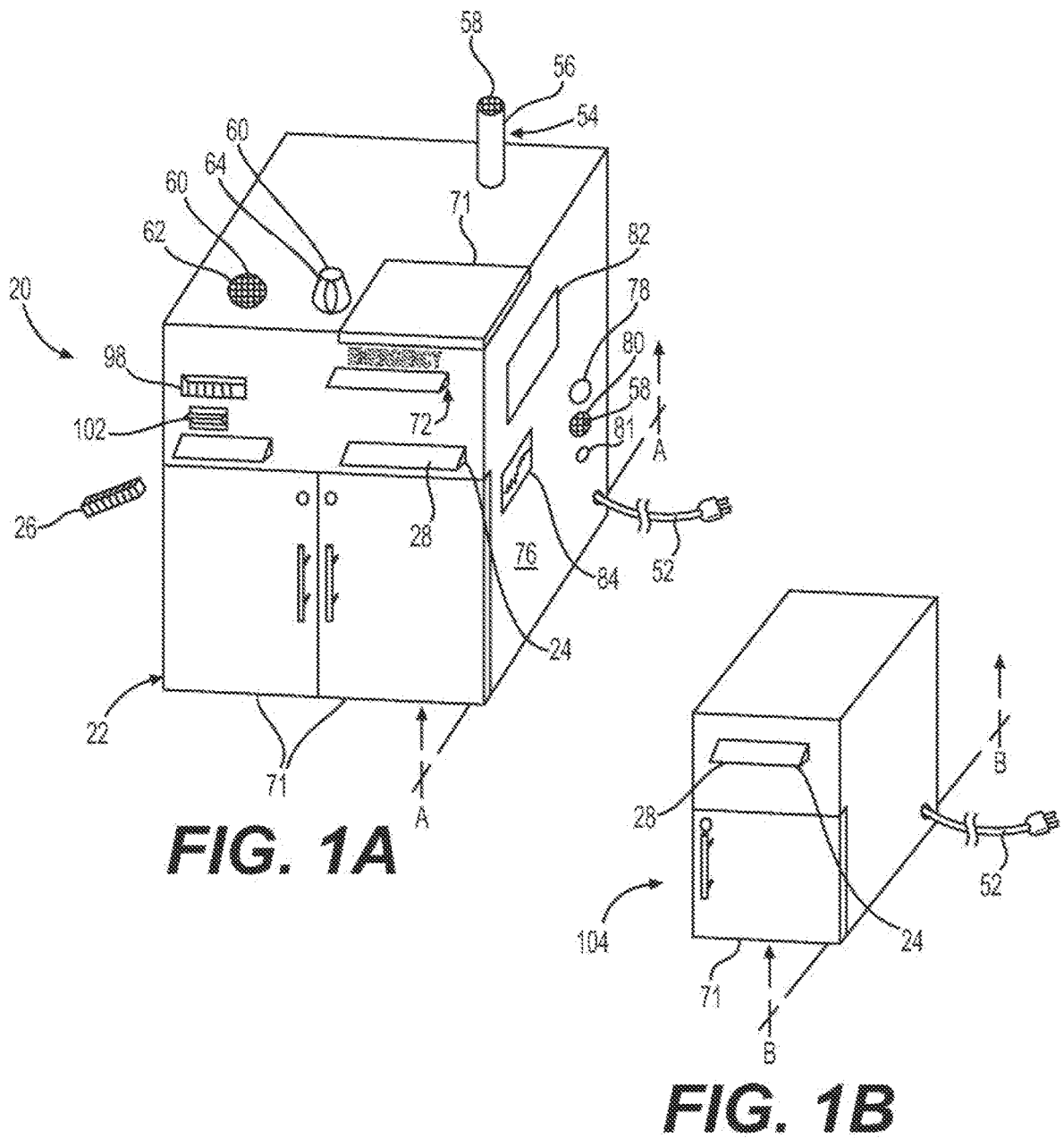
FIG. 1A
FIG. 1B
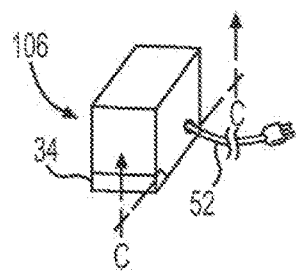
FIG. 1C

CONTAINMENT SYSTEM FOR HAZARDOUS PRODUCTS

CROSS-REFERENCE TO RELATED APPLICATION(S)

This application is a continuation of U.S. application Ser. No. 16/682,760 filed on Nov. 13, 2019, which claims the benefit of U.S. Provisional Application Ser. No. 62/760,573 filed Nov. 13, 2018, the entire disclosures of each are hereby incorporated by reference.

BACKGROUND

The present disclosure relates generally to a system for storing hazardous products, including, but not limited to, high capacity batteries and electronic devices such as laptop computers and mobile phones.

As high capacity batteries, such as lithium and lithium ion batteries, are used in more and more products, such as mobile phones and laptop computers, there is a desire to recycle the materials, such as lithium, contained therein. However, high capacity batteries pose storage and safety challenges. For example, the high capacity batteries may short out and overheat if their terminals come in contact with metal or other battery terminals. Also, the high capacity batteries present risks of fire, toxic gas release and smoke. A large quantity of used batteries in close proximity can cause a chain reaction of battery fires. Thus, storing and transporting a large quantity of high capacity batteries may be problematic, especially where personnel trained in extinguishing fires are not readily available.

SUMMARY

This section provides a general summary of the present disclosure and is not a comprehensive disclosure of its full scope or all of its features, aspects, and objectives.

Disclosed herein are implementations of a system for storing a hazardous product in accordance with aspects of the present disclosure. The system includes a housing unit defining a product opening. The system further includes a product door coupled to the housing unit adjacent to the product opening. The product door is configured to form a seal with the housing unit about the product opening in response to a thermal event.

Also disclosed herein are implementations of a system for storing a hazardous product in accordance with aspects of the present disclosure. The system includes a housing unit that defines a product opening. The system further includes a fire suppression system for suppressing a thermal event within the housing unit. The fire suppression system includes a reservoir that contains fire suppression materials and tubing disposed along a top of an interior of the housing unit and in fluid communication with the reservoir. The tubing is heat sensitive and configured to breach at a point of high temperature in response to an increase in temperature resulting from the thermal event to distribute the fire suppression materials from the reservoir toward the thermal event.

Also disclosed herein is a system for storing a hazardous product in accordance with aspects of the present disclosure. The system includes a housing unit for receiving the hazardous product. The hazardous product has a product ID tag, which includes product information. The system also includes a memory device that stores instructions and information. The system also includes a scanning device, a sensor, an alarm system, a communication system, and a fire suppression device operatively connected to the housing unit. The system further includes a processing device operatively coupled to the sensor, the memory device, the alarm system, the communication system, and the fire suppression device. The processing device is configured to execute the instructions to receive the product information from the scanning device. The processing device is further configured to execute the instructions to store the product information in the memory device. The processing device is further configured to execute the instructions to receive thermal event information from the sensor. The processing device is further configured to execute the instructions to store the thermal event information in the memory device. The processing device is further configured to execute the instructions to determine a thermal event based on the thermal event information. The processing device is further configured to execute the instructions to activate the alarm system in response to the thermal event. The processing device is further configured to execute the instructions to activate the fire suppression device in response to the thermal event. The processing device is further configured to execute the instructions to transmit, via the communication system, the product information and the thermal event information to an external device.

From the following figures, descriptions, and claims, other technical features may be readily apparent to one skilled in the art.

Before undertaking the DETAILED DESCRIPTION below, it may be advantageous to set forth definitions of certain words and phrases used throughout this patent document. The term "couple" and its derivatives refer to any direct or indirect communication between two or more elements, independent of whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or portions thereof adapted for implementation in a suitable computer readable program code. The phrase "computer readable program code" includes any type of computer code, including source code, linked or linkable code, object code, and executable code. The phrase "computer readable medium" includes any type of medium capable of being accessed by a computer, such as read only memory (ROM), solid state device (SSD) memory, random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as to future uses of such defined words and phrases.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 1A-C are perspective views of a system for storing hazardous products including a remote bin and a remote monitoring device in accordance with aspects of the present disclosure.

DETAILED DESCRIPTION

FIGS. 1-8 can include additional and/or fewer components and/or steps in an alternative order and are not limited to those illustrated in this disclosure.

A system for storing hazardous products is shown in FIGS. 1-6. The primary hazardous products contemplated in this disclosure are used batteries, such as high capacity batteries, including lithium and lithium-ion batteries, and electronics containing used high capacity batteries. New batteries and other desired hazardous products may also be contemplated.

Figure 2A:
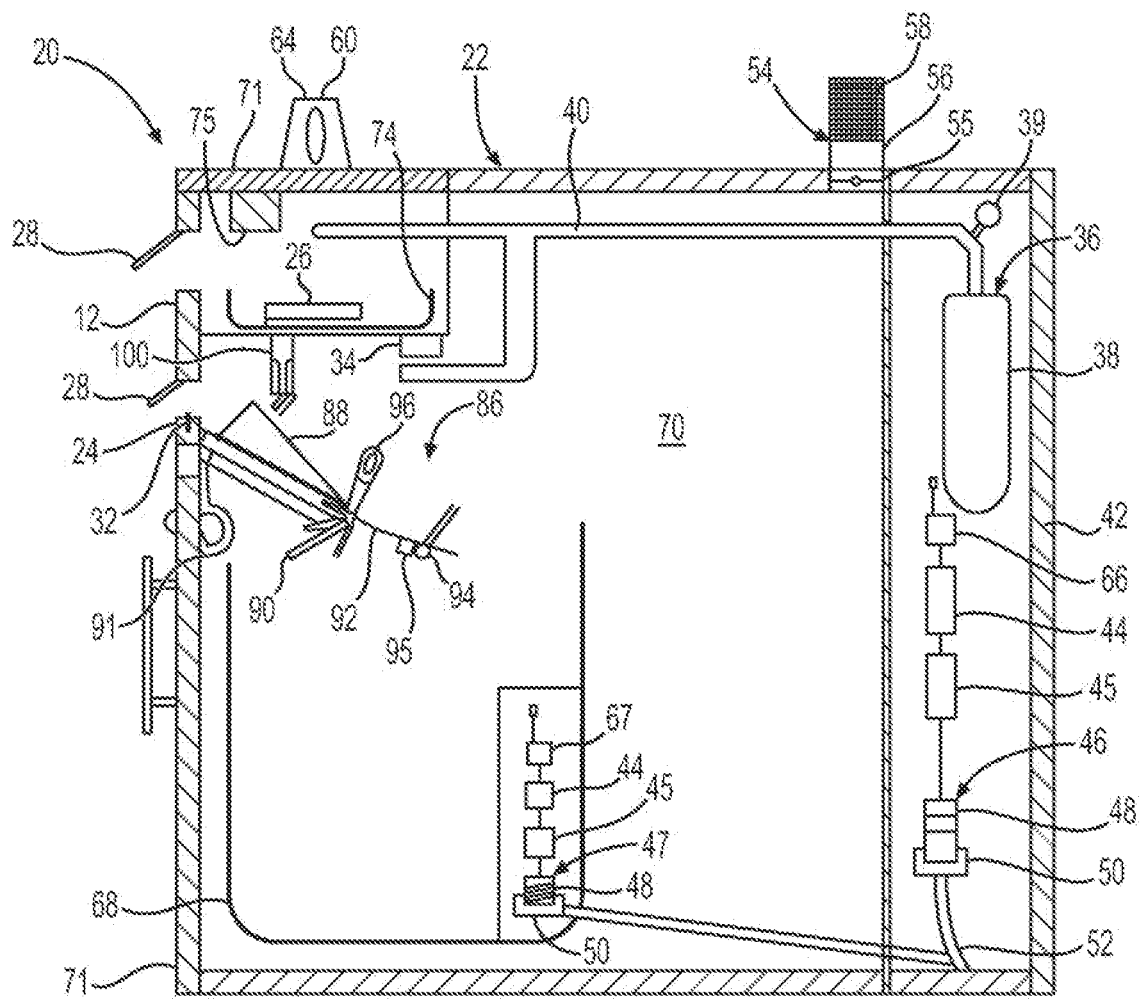
FIG. 2A is a cross-sectional view of the system of FIG. 1A across plane A in accordance with aspects of the present disclosure.

As best shown in FIGS. 1-2, a system 20 includes a housing unit 22. The housing unit 22 may be made from a fire retardant or fireproof material. For the purpose of this disclosure, the fire retardant and fireproof material can include steel, gypsum, perlite, or any other desired fire retardant or fireproof material. The housing unit may be coated in a fire retardant or fireproof material, such as a gypsum plaster, a cementitious plaster, or any other desired fire retardant or fireproof material. An interior of the housing unit 22 and any pass-throughs (for instance, for wiring) may be coated in an intumescent material (i.e., a coating or sealant that swells up when heated to protect the material underneath or seals a gap in the event of a thermal event). The thermal event can include outgassing from the hazardous product 26 (e.g., the presence of smoke methyl ethyl carbonate, acetone, styrene, benzene, hexane, butadiene, carbon monoxide, toluene, fluorotrimethylsilane, decane, and/or hydrogen gasses; the concentration of gasses may change leading up to or during the thermal event), an increase in temperature within the housing unit 22 (e.g., higher than about 160° F.), an increase in air pressure within the housing unit 22, a fire, an explosion, or any other conditions. The top, a portion of the top, or any other desired section of the housing unit 22 may be configured to be a breakaway section (i.e., a removable section). In the event of an explosion, the breakaway section can separate from the housing unit 22 so that force and debris are directed through a hole left by the breakaway section (e.g., in an upward direction). The housing unit 22 can include a product opening 24 to allow for the insertion of at least one hazardous product 26, such as a used battery. The housing unit 22 can includes multiple product openings 24. One or more of the product openings 24 can define one or more openings of various shapes and/or sizes to receive hazardous products 26 configured in various shapes and/or sizes.

A product door 28 may cover the product opening 24. If the system 20 includes more than one product opening 24, a single product door 28 can cover one or more of the product openings 24, or each product door 28 can cover a single product opening 24. The product door 28 may be self-closing, which may be accomplished by a gravity based solution (wherein the product door 28 is connected to the housing unit 22 by a hinge above its respective product opening), a spring based solution (wherein each product door 28 is connected to the housing unit 22 via a hinge and a spring that biases the product door 28 into a closed position), an actuated solution (in which a mechanical actuator closes the product door 28), or any other desired closing solution.

Figure 5:
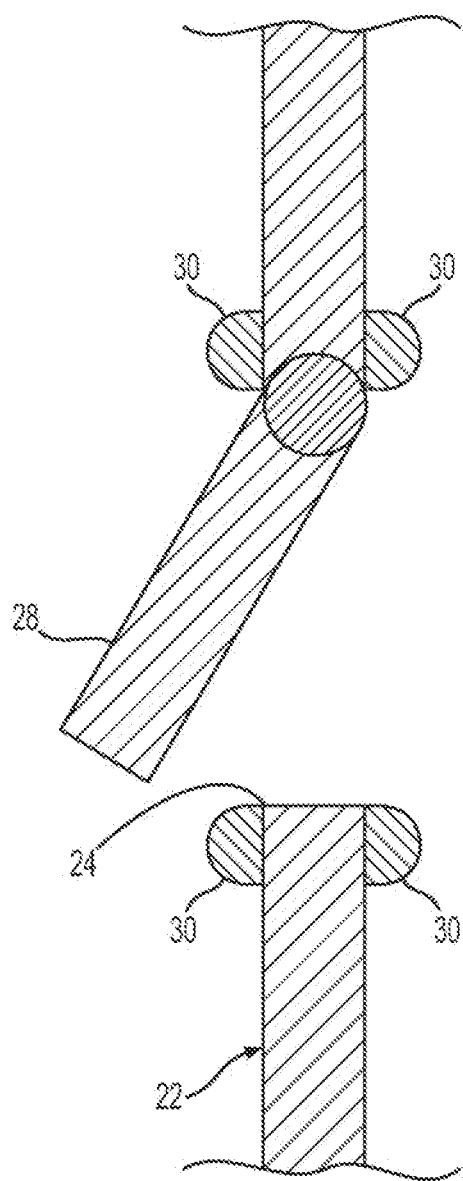
FIG. 5 is a cross-sectional view of a product opening of a housing unit in accordance with aspects of the present disclosure.

As shown in FIG. 5, each product door 28 may be configured to form a seal with the housing unit 22 about the product opening 24 in response to the thermal event. The thermal event can include outgassing from the hazardous product 26, an increase in temperature within the housing unit 22 caused by the hazardous product 26, a fire caused by the hazardous product 26, or any other event caused by a hazardous product failure. The seal can be formed by a first heat sensitive compound 30 (e.g., an intumescent compound) disposed about the product opening 24 that in response to heat generated by the thermal event, expands to prevent the product door 28 from opening. In response to heat generated by the thermal event, the seal can be formed by a second heat sensitive compound 30 disposed about the product opening to adhesively couple the product door 28 to the product opening 24. The seal can prevent the product door 28 from opening. The seal can be formed by a solenoid 32 that actuates to lock the product door 28 in a closed position in response to the thermal event. A spring encased in a heat sensitive plug (such as a wax with a melting point of about 120° F.) can be used to produce the seal. The heat sensitive plug prevents the spring from pushing the product door 28 from an open position (e.g., a first position) to a closed position (e.g., a second position). The seal can be formed when the plug heats up, melts, and stops preventing the spring from pushing the door 28 from the open position to the closed position.

The system 20 can include one or more sensors 34 for detecting the thermal event. The one or more sensors 34 can be at least one of the following sensors: a temperature sensor configured to detect an increase in temperature within the housing unit 22, an air pressure sensor configured to detect an increase in air pressure within the housing unit 22, a smoke detector configured to detect smoke produced within the housing unit 22 resulting from the thermal event, a thermal imaging device such as an infrared camera configured to detect heat produced by the thermal event within the housing unit 22, a chemical detector configured to detect gas concentrations within the housing unit, or any other desired sensor or device. The one or more sensors 34 may be in communication with the solenoid 32. For example, if the one or more sensors 34 detect a thermal event, the solenoid 32 can lock the product door 28 when it is in in a closed position.

The system 20 can include a fire suppression system 36 configured to suppress the thermal event within the housing unit 22. The fire suppression system 36 can include a reservoir 38. The reservoir 38 can contain or be configured to contain fire suppression materials or any other desired material. Fire suppression materials may include inert gasses (e.g., nitrogen, carbon dioxide, etc.), fluids (e.g., water), powders (e.g. sodium bicarbonate, potassium bicarbonate ($KHCO_3$), mono-ammonium phosphate (MAP), etc.), compounds (e.g., evaporating fluorocarbon) or any other dry chemicals or wet agents used for suppressing the thermal event. The reservoir 38 may include a reservoir sensor 39 configured to detect an amount of fire suppression material remaining in the reservoir 38. For example, the reservoir sensor 38 may be a pressure sensor configured to detect a pressure of gasses within the reservoir 36, a sensor configured to detect a liquid level within the reservoir 36, or any other desired sensor for detecting a fire suppression material level. The fire suppression system 36 may include or be in communication with one or more tubes, such as tubing 40. The tubing 40 can be disposed within the interior volume of the housing unit 22, such as along the top of the interior of the housing unit 22, along a wall of the housing unit 22, or any other desired location. The tubing 40 can be in fluid communication with the reservoir 38. The system 20 can include multiple reservoirs 38 disposed within the housing unit 22. The multiple reservoirs 38 can include the same or different fire suppression materials to be applied toward the thermal event at the same time and/or at different times. For example, a first fire suppression material from a first reservoir can be applied toward a first thermal event during a first time period and a second fire suppression material from a second reservoir can be applied toward the first thermal event during the first time period and/or during a second time period to function as a back-up in case the first reservoir 38 or any other component of the fire suppression system 36 fails. The first fire suppression material from the first reservoir can be applied toward the first thermal event and the second fire suppression material from the second reservoir can be applied toward a second thermal event.

The tubing 40 can contain fire suppression materials, for example, received from the reservoir 38. The tubing 40 can be pressurized to increase the flow of fire suppression materials out of the tubing 40, for example, to distribute the fire suppression materials toward the thermal event. The tubing 40 can be heat sensitive and configured to breach in response to an increase in temperature resulting from the thermal event in order to distribute the fire suppression materials from the reservoir 38 toward the thermal event. The tubing 40 can be configured to detach from the reservoir 38 without breaching to so that the reservoir 38 be removed and replaced. The tubing 40 can have attachments, such as nozzles, to distribute the fire suppression materials.

A modular attachment 42 can be detachably coupled to the housing unit 22. The modular attachment 42 can be configured to allow for easy replacement and maintenance of elements of the system 20, such as the reservoir 36. For example, the reservoir 38 of the fire suppression system 36 can be coupled to a wall of the modular attachment 42. Connection points and seams between the modular attachment 42 and the rest of the system 20 can be coated with an intumescent material to prevent fire escape during the thermal event.

Figure 6:
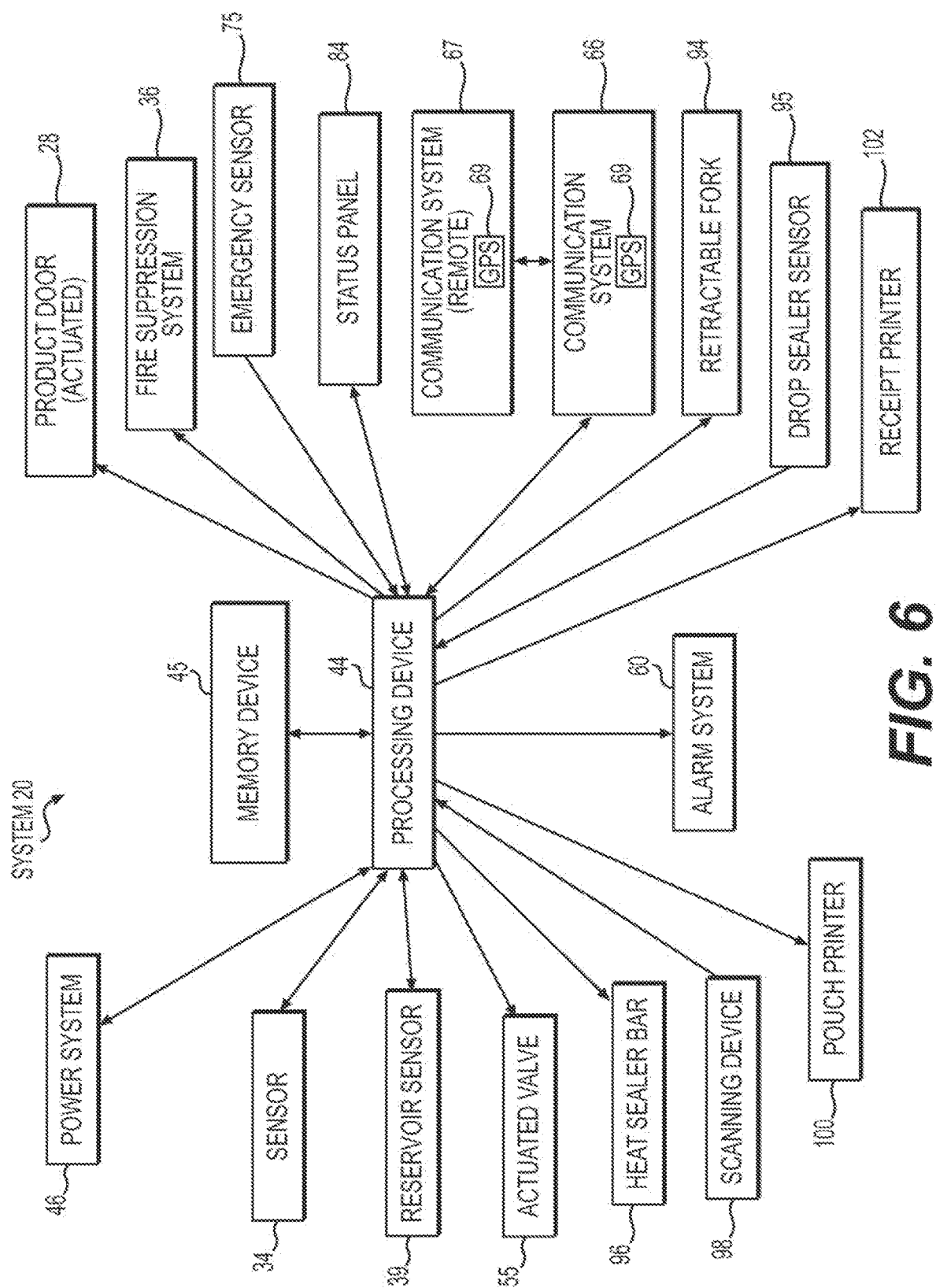
FIG. 6 is a schematic of electrical components of the system in accordance with aspects of the present disclosure.

As shown in FIG. 6, the system 20 can include a processing device 44 such as a processor and a memory device 45. The term "processor" should be understood to include computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. The memory device 45 should be understood to include a single disk or a plurality of disks (e.g., hard drives), a storage management module that manages one or more partitions within the memory, flash memory, semiconductor (solid state) memory, Random Access Memory (RAM), a Read-Only Memory (ROM), cloud storage, a combination thereof, or any other desired device. The memory device can be configured to store instructions executable by the memory device. The processing device 44 can be in communication with one or more of an actuated version of the product door 28, the solenoid 32, the sensor 34, electronically controlled embodiments of the fire suppression system 36, the reservoir sensor 39, the memory device 45, any later discussed electronic device, or any other desired device. The memory device 45 can be configured to store information—such as thermal event information, customer information, product information, and GPS location information—and instructions executable by the processing device 44. The processing device 44 can be configured to receive and execute instructions from the memory device 45. The processing device 44 can be configured to send information to be stored by the memory device 45. The processing device 44 can be configured to receive thermal event information from the senor 34. The processing device 44 can be configured to determine, based on thermal event information whether the thermal event has occurred. The processing device 44 can be configured to receive information about the status (for instance, pressure) of the reservoir or quantity of fire suppression materials remaining in the reservoir from the reservoir sensor 39. The processing device 44 can be configured to receive positional information from actuated embodiments of the product door 28. The processing device 44 can be configured to send a signal to actuate actuated embodiments of the product door 28 in response to periods of inactivity while the product door 28 has been left in an open position or in response to a determination of the thermal event. The processing device 44 can be configured to determine, based on thermal event information, whether the thermal event has occurred. In response to a thermal event occurring, the processing device 44 can execute the instructions to activate systems or components of the system 20, as described in more detail throughout this disclosure.

The system 20 can include a power system 46. The power system 46 can be configured to provide power to the system 20. The power system 46 can be configured to provide electricity through wiring or a wireless electrical transfer device to various electrical components, such as actuated embodiments of the product door 28 the solenoid 32, the sensor 34, reservoir sensor 39, electrically controlled embodiments of the fire suppression system 36, the processing device 44, and the memory device 45, or any other desired electrical component or system. The power system 46 can include a rechargeable battery 48, a battery charger 50, an electrical cord 52, or any other desired electrical components. The rechargeable battery 48 can be coupled to or located within the housing unit 22 and can be located in communication with the battery charger 50. The rechargeable battery 48 can provide power to the system 20 in order for the system 20 to function when it is not connected to an external power source. The power system 46 can be in communication with the processing device 44. The power system 46 can be configured to provide information such as battery charge remaining on the rechargeable battery 48 to the processing device 44.

The system 20 can include a ventilation system 54. The ventilation system 54 can be configured to direct gasses and/or heat produced during the thermal event from within the housing unit 22 to outside of the housing unit 22. The ventilation system 54 can includes a chute 56. The chute 56 can be made from a fire retardant or fireproof material. The chute 56 can be coated in a fire retardant or fireproof material. The chute 56 can include a flame arrestor 58 for limiting the spread of the thermal event. The flame arrestor 58 can include wire mesh, sheet metal with punched holes, or any other desired flame arrestor devices. The ventilation system 54 can include an actuated valve 55 for controlling the release of gasses and smoke produced by the thermal event in the housing unit 22. The actuated value 60 can be a valve that is mechanically operated by a hydraulic, electric or pneumatic actuator. The actuated valve 60 can be disposed within the chute 56. The actuated valve 60 can be operatively coupled to the processing device 44 and configured to open in response to a signal being received from the processing device 44. The ventilation system can also include a valve that is opened passively, that is, without controller signal. This passive method could be embodied similar to the seal of the product door 28 wherein a heat sensitive plug would release the valve to allow hot gases to escape upon experiencing an increase in temperature.

The system 20 can include an alarm system 60. The alarm system 60 can be in communication with and responsive to the sensor 34 and/or the processing device 44. The alarm system 60 can be configured to provide audio and/or visual signals in response to the sensor 34 detecting the thermal event or the processing device 44 determining the presence of the thermal event and sending a signal for the alarm system to activate. For example, the audio signals can be provided through a speaker 62, a siren, or any other desired audio device. The audio signals made in response to the sensor 34 detecting the thermal event through the speaker 62 can provide informative and/or instructive statements such as "fire detected in battery container, please keep away," "outgassing detected in battery container, please keep away," or any other desired message. The visual signals can be provided by a rotating beacon 64 on top of the housing unit 22, a light coupled to the housing unit 22, or any other desired visual device.

The system 20 can include a communication system 66. The communication system 66 can be in communication with and responsive to the sensor 34. The communication system 66 can be configured to transmit a signal to an external device in response to the sensor detecting the thermal event. The communication system 66 can be in communication with the processing device 44. For example, the processing device 44 can, in response to determining the presence of the thermal event, instruct the communication system 66 to send the signal. The signal can be transmitted to an external device, such as to a smart phone, a tablet, a computer, or any other desired device, for example, via a text message, a voice message, an e-mail, an alert from an app, or any other desired communication. For example, the signals may be transmitted to send communication to an individual person, such as a person responsible for the system 20; to an emergency service center in order to alert personnel trained in fire suppression techniques; to a remote service responsible for the system, such as to allow the remote service to make a decision as to whether summoning emergency services is warranted; or to any other desired person, company, or service center. The communication system 66 can include a Wi-Fi transmitter and/or receiver; a 3G, 4G, or 5G wireless device; a radio device; or any other desired transmission device. The communication system 66 can include a Global Positioning System (GPS) 69. The GPS 69 can be configured to track the location of the system 20 and communicate with the communication system 66 to provide its location.

The system 20 can include a product bin 68. The product bin 68 can be removably disposed within the housing unit 22. The product bin 68 can be configured to receive the hazardous product 26 inserted through the product opening 24. The product bin 68 can be made from and/or coated with fire retardant, fireproof material, intumescent material, or any other desired material, for example, as discussed relative to the housing unit 22. The housing unit 22 may have multiple product openings 24. One product bin 68 can be placed in the housing unit 22 adjacent to each of the multiple product openings 24. Each product bin 68 can include its own communication system 66, power system 46, alarm system 60 or any other desired system. Each product bin 68 can have a unique bin ID tag associated with that particular product bin 68. Similarly, each hazardous product can have a unique hazardous product ID tag associated with that particular hazardous product. The unique bin ID tag may include information on the one or more hazardous products that have entered the product bin 68. The product bins 68 each can have a memory device 45 and a processing device 44. The product bins 68 each can include a remote communication system 67 that can be connected the communication system 66 of the system 20. The remote communication system 67 can include the elements of the communication system 66. The remote communication systems 67 are configured to send information to the communication system 66, and allow the product bins 68 to communicate information to other remote devices when removed. For example, the remote communication systems 67, when instructed to by the processor 44, transmit hazardous product information stored in the memory device 45 to a remote system, such as a system at a recycling facility. The product bins 68 each can include a remote power system 47. The remote power system 47 can include the elements of the power system 46. For example, the remote power system 47 can be detachably coupled to the power system 46 via an electrical cord 52, include a battery charge 50 and a rechargeable battery 48. The remote power system 47 can be in wireless powering communication with the power system 46.

Where there is more than one product opening 24, a dividing wall 70 can be disposed between each of the product openings 24. The dividing wall 70 can be made from a fire retardant or fireproof material as discussed above in the context of the housing unit 22. The dividing wall 70 can be coated in a fire retardant or fireproof material as discussed above in the context of the housing unit 22. The dividing wall 70 can divide the housing unit 22 into sections. The sections can be self-containing individual compartments. The individual compartments can be configured to contain the spread of fire caused from the thermal event. At least one sensor 34 can be operatively coupled to each section. Each section can have its own associated fire suppression system 36. For example, in response to a thermal event being detected by the sensor 34 in a single section, the fire suppression system 36 can be configured to provide fire suppressant materials to that specific section. Distributing the fire suppressant material toward the thermal event located in specific sections and/or individual compartments reducing the quantity of fire suppression material used to suppress the thermal event, increases the efficiency of the fire suppression system 36, reduces and/or eliminates damage to hazardous products disposed in other sections and/or individual compartments within the housing unit 22. The housing unit 22 can include a door 71 to allow for access to the hazardous products 26 or the product bins 68. Where there are multiple sections, each section has its own door 71. The door 71 can be made from a fire retardant or fireproof material as discussed above in the context of the housing unit 22. The door 71 can be coated in a fire retardant or fireproof material as discussed above in the context of the housing unit 22. The door 71 can be actuated. In embodiments in which the door 71 is actuated, the door 71 can be in communication with the processing device 44 and move from a first (closed) position to a second (open) position or from the second (open) position to the first (closed) position responsive to an instruction from the processing device 44. For example, the processing device 44 may send an instruction to an actuated embodiment of the door 71 to close upon determination of the thermal event open the door 71 upon determination of the end of a thermal event.

The system 20 can include an emergency opening 72. The emergency opening 72 can be defined by the housing unit 22 and configured to receive a hazardous product 26 that is at a particularly high risk of, or actually undergoing, the thermal event. The emergency opening 72 can be covered by a product door 28. An emergency bin 74 can be disposed within the housing unit 22 and positioned adjacent to the emergency opening 72. The emergency bin 74 can be configured to receive the hazardous product 26 inserted through the emergency opening 72. The emergency bin 74 can be configured to store the hazardous product 26. The housing unit 22 can include a door 71, configured as discussed previously, to allow for access to the hazardous products 26 or emergency bin 74 behind the emergency opening 72. An emergency sensor 75 can be located proximate the emergency opening 72 or emergency bin 74. The emergency sensor 75 can be configured to detect the hazardous product 26 entering through the emergency opening 72 and/or the thermal event occurring within the emergency bin 74. The emergency sensor 75 can be in communication with the processing device 44. For example, the emergency sensor 75 can send a signal to the processing device 44 indicating that the emergency opening 72 has been used or that a thermal event is occurring in the emergency bin 74. The processing device 44 can then send a signal to the fire suppression system 36 to direct fire suppressant material toward the thermal event in the emergency bin 74. The processing device 44 can further signal the alarm system 60, including the speaker 62 and the rotating beacon 64 to activate. The processing device 44 can further signal the communication system 66 to transmit the thermal event information or information indicating the use of the emergency bin 74 to a remote device, such as a computer at a fire station.

Figure 2B:
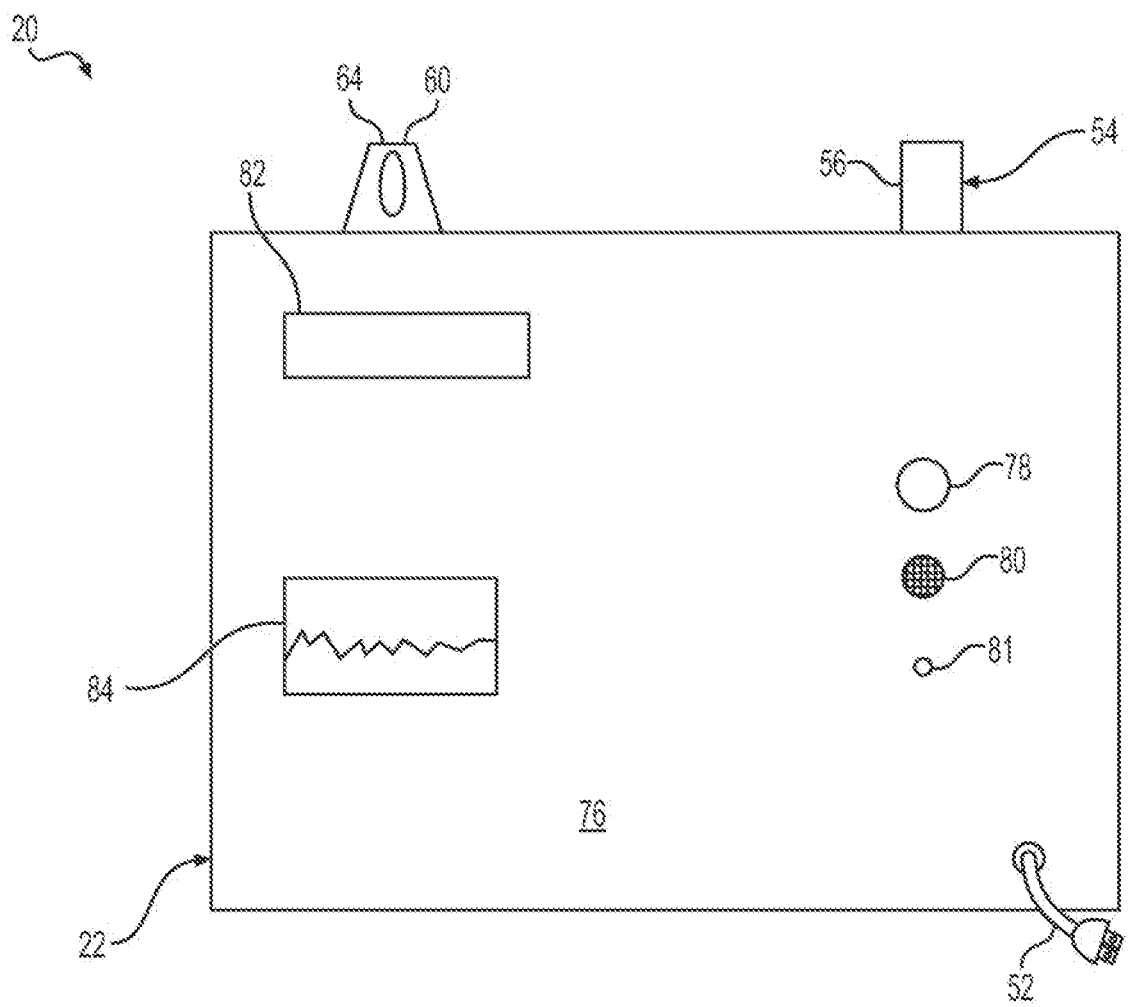
FIG. 2B is a side view of the system of FIG. 1 in accordance with aspects of the present disclosure.

As shown in FIG. 2B, the system 20 can include a responder access panel 76. The responder access panel 76 can be coupled to or formed as a portion of the housing unit 22. The responder access panel 76 can include a fire suppressant port 78 for receiving a liquid or gaseous fire suppressant material. The responder access panel 76 can include a venting port 80 configured to selectively release gasses and heat produced by the thermal event. The venting port 80 can include a flame arrestor 58. The responder access panel 76 can include a sensor port 81 for allowing a person, such as a first responder, to insert additional sensors to allow for further monitoring of the interior of the housing unit 22. For instance, the sensor port 81 may include a one-way hatch that allows a firefighter to insert a sensor that provides a different type of information than the sensor 34 is providing (for example, first responders may want to know the temperature in an instance where the sensor 34 is a smoke detector). The responder access panel 76 can include a viewing portal 82. The viewing portal 82 may allow a person to visually inspect the thermal event. For example, a person can view the thermal event through the viewing portal 82 to inspect the status of the thermal event, such as a progress of the suppression of the thermal event. The responder access panel 76 can include a status panel 84 for displaying internal status information for the housing unit 22 received from the sensor(s) 34. The status panel 84 can be a display, touch screen, or any other desired device that allows for viewing of information and/or inputs and selection of information to display. The status panel 84 can be a display, a touch screen, or any other desired device configured to display information and/or inputs and to receive a selection of information. For example, the status panel 84 can include inputs for a user to select the type of information for viewing on the display. The responder access panel 76 can include an option for activating, deactivating, or changing actions of the system 20 or any systems, device, or components operatively coupled to the system 20.

The system 20 can include a product containment system 86. The product containment system 86 can be disposed adjacent to the product opening 24. The product containment system 86 can be configured to enclose the hazardous product 26 in an insulated pouch 88. A non-limiting example of the product containment system is a gravity-slide drop sealer 90, though other desired product containment systems can be used. Operation of the gravity-slide drop sealer 90 can involve an air blower 91 of the gravity-slide drop sealer 90 inflating the insulated pouch 88 with one open end from a stack of insulated pouches 88; after placement of the hazardous product 26 into and through the product opening 24, the hazardous product 26 sliding into the now-inflated insulated pouch 88; the insulated pouch 88 sliding down a ramp 92 of the gravity-slide drop sealer 90; the insulated pouch 88 being stopped by a retractable fork 94 (a retractable set of tines that block further travel of the insulated pouch 88); a drop sealer sensor 95 configured to detect the presence of the insulated pouch 88 containing the hazardous product 26; a heat sealer bar 96 configured to seal the insulated pouch 88 by lowering to apply heat (for instance, through the bar being heated or delivering a stream of heated air) to the insulated pouch 88; the insulated pouch sliding into one of the product bins 68, or any other desired operation. The gravity-slide drop sealer 90 can also include reel including of a flattened tube of insulated pouch material. The tube is cut to size prior to inflation by the air blower 91 to form the insulated pouches 88. The product containment system 86 can be in communication with the processing device 44 and responsive to instructions from the processing device 44. For example, the processing device 44 may receive a signal from the drop sealer sensor 95 that indicates that the insulated pouch 88 has reached the retractable fork 94 and then send out a signal instructing the heat sealer bar 96 to lower and apply heat to the insulated pouch 88. The product containment system 86 can alternatively include an external reel of insulated pouches 88. The reel of insulated pouches 88 can be configured for removal of a single insulated pouch 88 (as an example, by tearing along a perforated line), place the hazardous product 26 into the insulated pouch, seal the insulated pouch 88 (for example, using a press-seal as used in a plastic bag), and placing the insulated pouch 88 now containing the hazardous product 26 through the product opening 24. The insulated pouches 88 can be made from material that is non-conductive, chemically resistant to corrosives, recyclable, functions in a temperature range from −20° F. to 180° F., and/or have any other desired properties.

The system 20 can include a scanning device 98 coupled to the housing unit 22. The scanning device 98 can be configured to scan a product ID tag associated with the hazardous product 26 and/or a customer ID tag associated with a customer (containing, for example, information about a customer such as account number and contact information) to generate scanned information. The ID tags can be barcodes, QR codes, RFID tags, or other desired ID methods. The scanning device 98 can be a barcode scanner, a camera configured to read QR codes, an RFID scanner, or any other desired scanning device. The scanning device 98 can be in communication with the processing device 44. The scanning device 98 can be in communication with the power system 46 for receiving power. The scanning system can be in communication with the processing device 44, with the processing device 44 being configured to receive the scanned information and transmit the scanned information to be stored in the memory device 45. The processing device 44 may also determine, based on the product information and/or the customer information, a return award amount for returning the hazardous device (similar to bottle and aluminum can return awards).

The system 20 can include a marking device, such as a pouch printer 100 or any other desired printing device. The marking device can be disposed within the housing unit 22. The marking device can be configured to mark the insulated pouch 88 with the scanned information. The marking device can be configured to telescope downward to mark the insulated pouch 88. The marking device can be in communication with the processing device 44. For example, the processing device 44 may receive scanned information from the scanning device 98 and then send out a signal instructing the pouch printer 100 to lower and print scanned information, such as product information from the scanned device, on the insulated pouch 88.

A receipt printer 102 can be coupled to the housing unit 22. The receipt printer 102 can be configured to print a receipt for a customer. The receipt may include information, such as product information from the scanning device 98, customer information from the scanning device 98, the return award amount determined by the processing device 44, or any other desired information. The receipt printer 102 can be in communication with the processing device 44. Alternatively, the processing device 44 may be configured to provide an electronic receipt by sending instructions to the communication system 66 to provide an electronic receipt via text, e-mail, to an app, or any other desired electronic receipt method.

Figure 3:
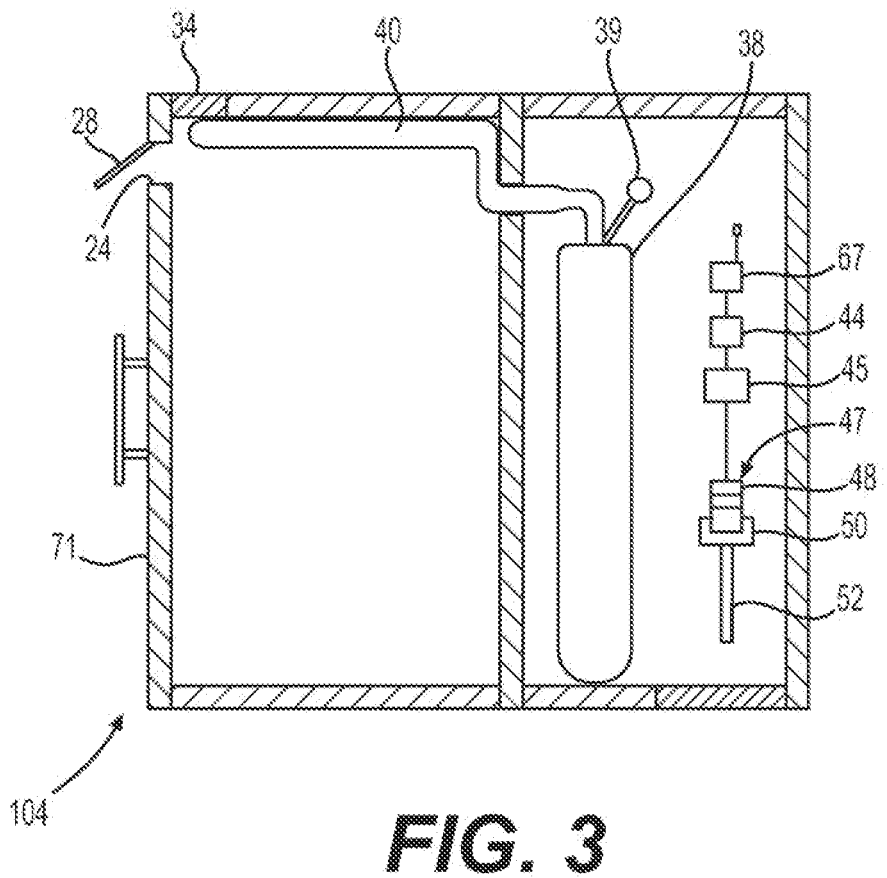
FIG. 3 is a cross-sectional view the remote bin of FIG. 1B across plane B in accordance with aspects of the present disclosure.

The system 20 can include one or more remote bins 104. The remote bins 104 can be configured to receive the hazardous product 26, as best shown in FIGS. 1 and 3. The remote bins 104 are essentially extensions of the system 20 and are used for situations in which more bins are required, but not every element of the system 20 is needed to be repeated in the same area. An interior of the remote bins 104 and/or any pass-throughs of the remote bins 104 can be made from and/or coated with fire retardant, fireproof material, intumescent material, or any other desired material, for example, as discussed relative to the housing unit 22. The remote bins 104 can each have a product opening 24 and product door 28. The remote bins 104 can each have their own sensor 34. The remote bins 104 can each have a processing device 44. The remote bins 104 can each have a memory device 45. The remote bins 104 can each include remote communication systems 67 that can be connected the communication system 66 of the main system 20. The remote bins 104 each can include a power system 46. The remote bins 104 each can have its own fire suppression system 36, including tubing 40 and a reservoir 38. The remote bins 104 can include one or more sensor 34 for detecting thermal events. Detection of the thermal event in the remote bins 104 can activate the fire suppression system 36 within the remote bins 104. Detection of the thermal event in the remote bins 104 can be communicated by the communication system 66 of the remote bins 104 to activate the alarm system 60. An example of the remote bins 104 having fewer features that the full system 20 and working within the system 20 would include having a system 20 having an alarm system 60, a communication system 66 and a processor 44 paired with remote bins 104 each without an alarm system 60. Upon receiving thermal event information from the sensor 34 in the remote bin 104, the processing device 44 in the remote bin 104 could be configured to send the thermal event information to the remote communication system 67, which could be configured to transmit the thermal event information to the communication system 66 of the system 20, which could be configured to send the thermal event information to the processing device 44 of the system 20, which could be configured to activate the alarm system 60. In the preceding example, only one alarm system was required to service multiple remote bins 104.

Figure 4:
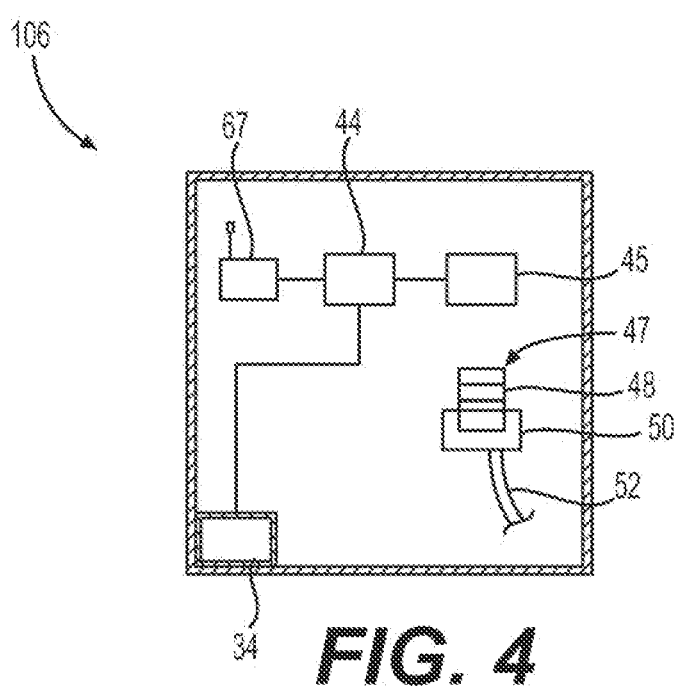
FIG. 4 is a cross-sectional view of the remote monitoring device of FIG. 1C across plane C in accordance with aspects of the present disclosure.

The system 20 can include a remote monitoring system 106 for acting as a hub for remote bins 104 and monitoring the remote bins 104, as best shown in FIGS. 1 and 4. The remote monitoring system 106 can include the sensor 34. The remote monitoring system 106 can include a processing device 44, a memory device 45, a communication device 66, an alarm system 60, or any other desired components. An example of the remote monitoring system 106 acting as a hub for remote bins 104 could include having a system 20 including a communication system 66 and an alarm system 60 being paired with a remote monitoring system 106 including a sensor 34 (for this example, a smoke detector) and a remote communication system 67 being paired with and located above remote bins 104 each lacking a sensor 34 a remote communication system 67, and an alarm system 60. Upon receiving thermal event information from the sensor 34 in the remote monitoring system 106 (in this instance, the smoke detector is detecting smoke coming from one of the remote bins 104 located below the remote monitoring system 106), the processing device 44 in the remote monitoring system 104 could be configured to send the thermal event information to the remote communication system 67, which could be configured to transmit the thermal event information to the communication system 66 of the system 20, which could be configured to send the thermal event information to the processing device 44 of the system 20, which could be configured to activate the alarm system 60. In the preceding example, only one alarm system 60 and two communication systems 66,67 are required to service a multiple remote bins 104.

FIG. 6 shows exemplary electrical components of the system 20 in communication with each other. The processing device 44 can be in communication with one or more of the following: an actuated version of the product door 28; the sensor 34; the fire suppression system 36; the reservoir sensor 39; the memory device 45; the power system 46; the actuated valve 55; the alarm system 60; and the communication system 66; a remote communication system 67, such as one in a remote bin 104 or remote monitoring system 106, via the communication system 66. The processing device 44 can be in communication with one or more of the following: the emergency sensor 75; the status panel 84; the retractable fork 94; the drop sealer sensor 95; the heat sealer bar 96; the scanning device 98; the pouch printer 100; and the receipt printer 102.

Figure 7A:
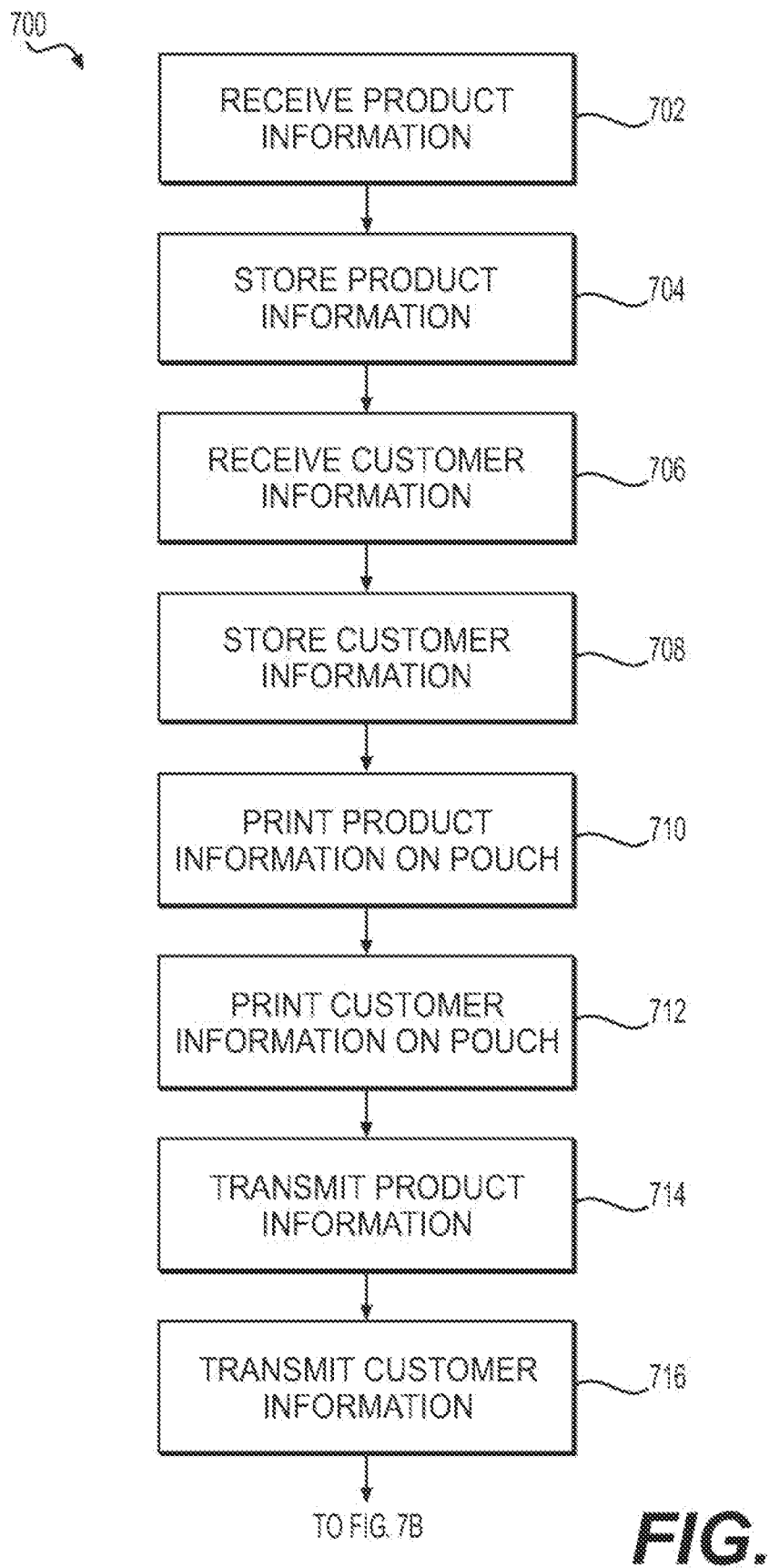
FIGS. 7A-C illustrate a method in accordance with aspects of the present disclosure.
Figure 7B:
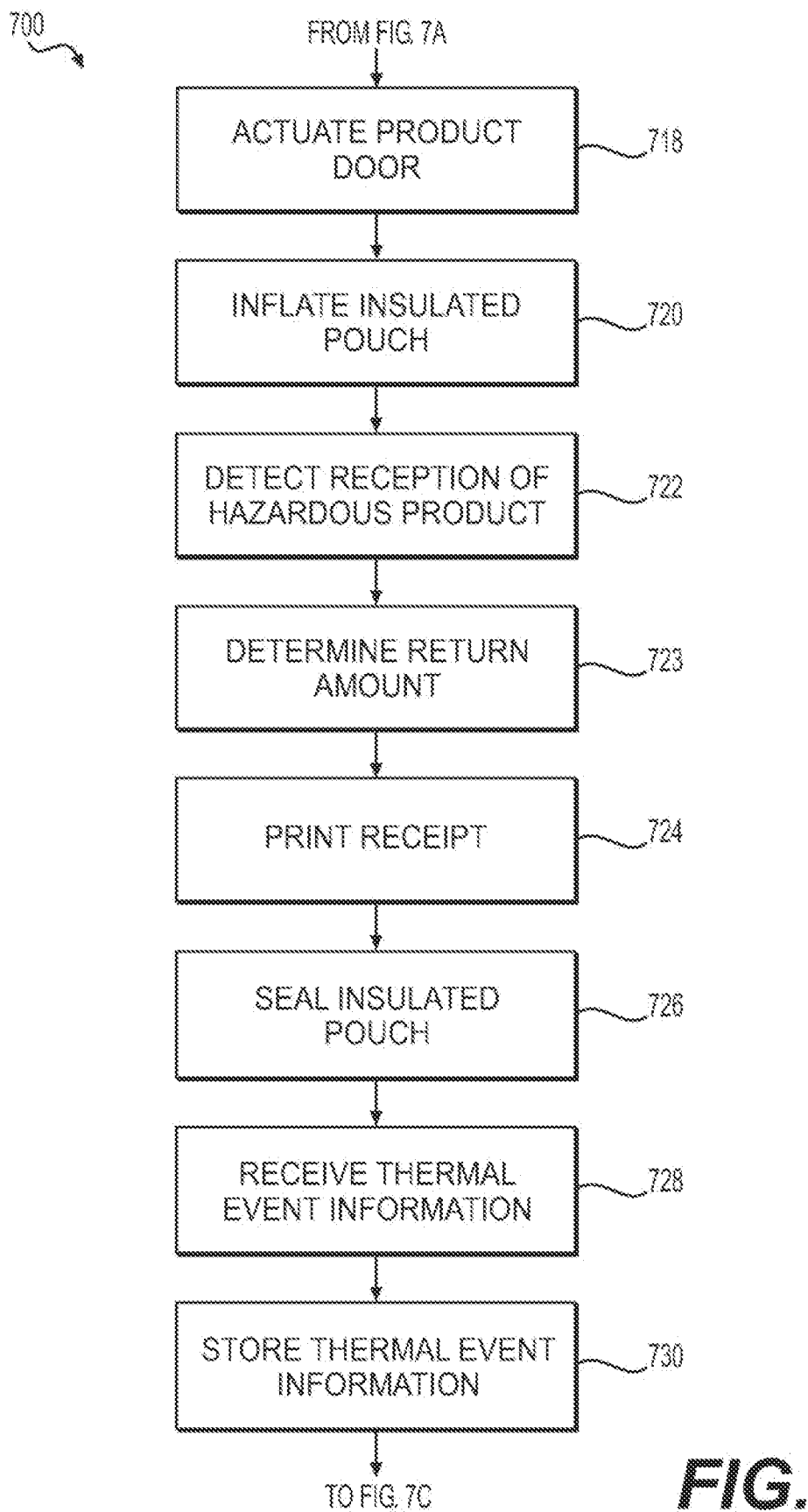
Figure 7C:
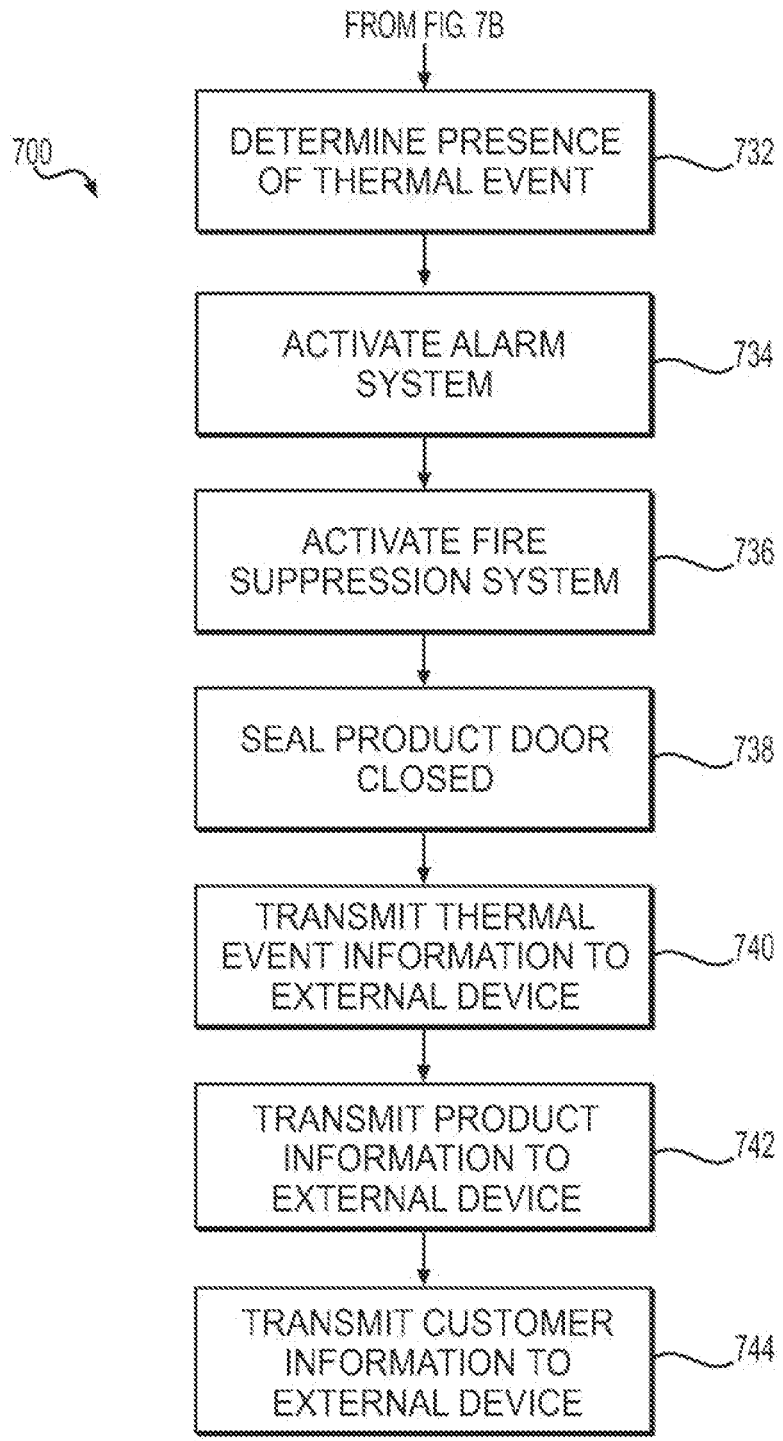

FIGS. 7A-7C illustrate a method 700 for operating an embodiment of the system 20. To execute the instructions for method 700, the processing device 44 is operatively coupled to one or more of the following: the memory device 45 for storing the instructions for method 700 and information; the sensor 34 for detecting the thermal event; the alarm system 60 for producing the alarm; the communication system 66 for transmitting thermal event information, product information, and customer information to a remote side; the scanning device 98 for scanning hazardous product and/or customer ID tags to produce scanned information; the pouch printer 100 for printing product information and customer information onto am insulated pouch; electronic elements of the gravity-slide drop sealer 90 including the air blower 91, retractable fork 94, drop sealer sensor 95, and heat sealer bar 96 for sealing the hazardous product into the insulated pouch; the receipt printer 102 for printing a receipt for a customer; and the fire suppression system 36 for suppressing the thermal event. The steps of method 700 may be executed sequences other than those described.

At step 702, the processing device 44 receives product information from the scanning device 98. For example, the scanning device 98 can transmit—and the processing device 44 can receive—the product information from the scanned hazardous product ID tag.

At step 704, method 700 can include storing the product information in the memory device 45. For example, the processing devices 44 can transmit—and the memory device 45 can receive and store—the product information from the scanned hazardous product ID tag.

At step 706, the method 700 can include receiving customer information from the scanning device 98. For example, the scanning device 98 can transmit—and the processing device 44 can receive—the customer information from the scanned customer ID tag.

At step 708, the method 700 can include storing the customer information in the memory device 45. For example, the processing devices 44 can transmit—and the memory device 45 can receive and store—the customer information from the scanned customer ID tag.

At step 710, method 700 can include printing the product information on an insulated pouch 88. For example, the processing device 44 can send a signal to the pouch printer 100 to print the product information onto the insulated pouch 88.

At step 712, method 700 can include printing the customer information on the insulated pouch 88. For example, the processing device 44 can send a signal to the pouch printer 100 to print the customer information onto the insulated pouch 88.

At step 714, method 700 can include transmitting the product information to a remote location. For example, the processing device 44 can send a signal to the communication system 66 to transmit the product information to an offsite data center.

At step 716, the method 700 can include transmitting the customer information to a remote location. For example, the processing device 44 can send a signal to the communication system 66 to transmit the customer information to an offsite data center.

At step 718, the method 700 can include actuating the product door 28 open to receive the insulated pouch 88. For example, the processing device 44 can send a signal to an actuated embodiment of the product door 28 to move from a closed position to an open position.

At step 720, the method 700 can include the gravity-slide drop sealer 90 inflating the insulated pouch 88. For example, the processing device 44 can send a signal to the air blower 91 of the gravity slide drop sealer 90 to active the air blower 91 and thereby inflate the insulated pouch 88.

At step 722, the method 700 can include detecting the reception of the hazardous product 26 in the insulated pouch 88. For example, the drop sealer sensor 95 can send—and the processing device 44 can receive—a signal indicating that the hazardous product 26 in the insulated pouch 88 has reached the retractable fork 94.

At step 723, the method 700 can include determining, based on the product information and/or the customer information, a return award amount for returning the hazardous device (similar to bottle and aluminum can return awards). For example, the processing device 44 can calculate the return award amount based on comparing the product information to an award list.

At step 724, the method 700 can include printing a receipt for the customer. For example, the processing device 44 can send a signal to the receipt printer 102 to instruct the receipt printer 102 to print out the receipt with the return award amount, product information, and/or customer information.

At step 726, the method 700 can include sealing the insulated pouch 88. For example, the processing device 44 can send a signal to the heat sealer 96 bar to instruct the heat sealer bar to lower and apply heat to the insulated pouch 88 in order to seal the insulated pouch 88.

At step 728, the method 700 can include receiving thermal event information from the sensor 34. For example, the sensor 34 can transmit—and the processing device can receive—the thermal event information, such as temperature, pressure, gas concentrations, presence of smoke, or other desired thermal event information.

At step 730, the method 700 can include storing the thermal event information in the memory device 45. For example, the processing devices 44 can transmit—and the memory device 46 can receive and store—the thermal event information.

At step 732, the method 700 can include determining the presence of a thermal event based on the thermal event information. For example, the processing device 44 can compare the thermal event information with past thermal event information to determine whether the thermal event information has passed a threshold that may indicate the presence of a thermal event (e.g., a temperature sensor shows a sharp increase in temperature from 72° F. to 118° F.).

At step 734, the method 700 can include activating the alarm system in response to the thermal event. For example, the processing device 44 can send a signal to the speaker 62 to output "fire detected in battery container, please keep away" and a signal to activate the rotating beacon 64.

At step 736, the method 700 can include activating the fire suppression device 36 in response to the thermal event. For example, the processing device 44 can send a signal to the fire suppression system 36 to release the fire suppressant through the tubing 40 and toward the thermal event.

At step 738, the method 700 can include sealing the product door closed in response to the thermal event. For example, the processing device 44 can send a signal to the solenoid 32 to seal the product door 28 closed.

At step 740, the method 700 can include transmitting, via the communication system, the thermal event information to an external device, such as to emergency services. For example, the processing device 44 can send a signal to the communication system 68 to transmit the thermal event information to a remote device, such as a computer at a fire station.

At step 742, the method 700 can include transmitting, via the communication system, the product information to an external device, such as to emergency services. For example, the processing device 44 can send a signal to the communication system 68 to transmit the product information to a remote device, such as a computer at a fire station.

At step 744, the method 700 can include transmitting, via the communication system, the customer information to an external device, such as to emergency services. For example, the processing device 44 can send a signal to the communication system 68 to transmit the customer information to a remote device, such as a computer at a fire station.

Figure 8:
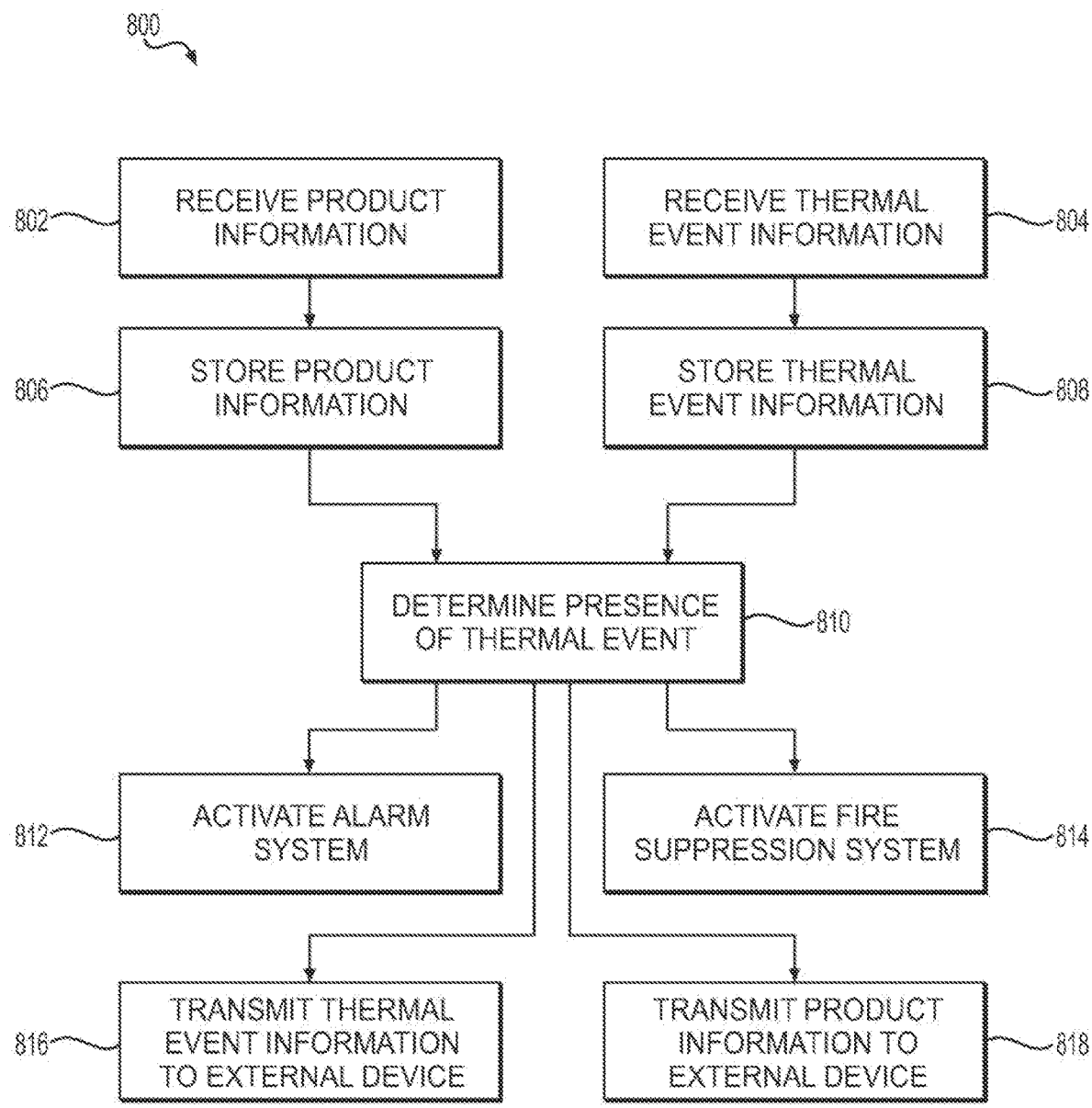
FIG. 8 illustrates another method in accordance with aspects of the present disclosure.

FIG. 8 illustrates a method 800 for operating an embodiment of the system 20. To execute the instructions for the method 800, the processing device 44 is operatively coupled to one or more of the following: the memory device 45 for storing the instructions of the method 800 and information; the sensor 34 for detecting the thermal event; the scanning device 98 for acquiring scanned information, the alarm system 60 for producing the alarm; the communication system 66 for transmitting product information and thermal event information, and the fire suppression system 36 for suppressing the thermal event. The steps of method 700 may be executed sequences other than those described.

At step 802, the method 800 can include receiving product information from the scanning device 98. For example, the scanning device 98 can transmit—and the processing device 44 can receive—the product information from the scanned hazardous product ID tag.

At step 804, the method 800 can include receiving thermal event information from the sensor 34. For example, the sensor 34 can transmit—and the processing device can receive—the thermal event information, such as temperature, pressure, gas concentrations, presence of smoke, or other desired thermal event information.

At step 806, the method 800 can include storing the product information in the memory device 45. For example, the processing devices 44 can transmit—and the memory device 45 can receive and store—the product information from the scanned hazardous product ID tag.

At step 808, the method 800 can include storing the thermal event information in the memory device 45. For example, the processing devices 44 can transmit—and the memory device 46 can receive and store—the thermal event information.

At step 810, the method 800 can include determining the presence of a thermal event based on the thermal event information. For example, the processing device 44 can compare the thermal event information with past thermal event information to determine whether the thermal event information has passed a threshold that may indicate the presence of a thermal event (e.g., a temperature sensor shows a sharp increase in temperature from 72° F. to 118° F.).

At step 812, the method 800 can include activating the alarm system in response to the thermal event. For example, the processing device 44 can send a signal to the speaker 62 to output "fire detected in battery container, please keep away" and a signal to activate the rotating beacon 64.

At step 814, the method 800 can include activating the fire suppression device in response to the thermal event. For example, the processing device 44 can send a signal to the fire suppression system 36 to release the fire suppressant through the tubing 40 and toward the thermal event.

At step 816, the method 800 can include transmitting, via the communication system, the thermal event information to an external device, such as to emergency services. For example, the processing device 44 can send a signal to the communication system 68 to transmit the thermal event information to a remote device, such as a computer at a fire station.

At step 818, the method 800 can include transmitting, via the communication system, the product information to an external device, such as to emergency services. For example, the processing device 44 can send a signal to the communication system 68 to transmit the product information to a remote device, such as a computer at a fire station.

The following clauses disclose embodiments of the disclosure.

Clause 1. A system for storing a hazardous product, comprising:

a housing unit defining a product opening; and a product door coupled to the housing unit adjacent to the product opening, wherein the product door is configured to form a seal with the housing unit about the product opening in response to a thermal event.

Clause 2. The system of any preceding clause, wherein the seal is a heat activated adhesive or a thermally expansive sealant configured to expand in response to an increase in temperature.

Clause 3. The system of any preceding clause, further comprising:

a sensor for detecting the thermal event; and a device that seals the product door in response to the sensor detecting the thermal event.

Clause 4. The system of any preceding clause, further comprising:

a fire suppression system configured to suppress the thermal event within the housing unit, wherein the fire suppression system includes a reservoir containing fire suppression materials and tubing disposed along a top of an interior of the housing unit and in fluid communication with the reservoir.

Clause 5 The system of any preceding clause, wherein the tubing also contains fire suppression materials, is pressurized, is heat sensitive, and is configured to breach in response to an increase in temperature resulting from the thermal event to distribute the fire suppression materials from the reservoir toward the thermal event.

Clause 6. The system of any preceding clause, further comprising:
a modular attachment that is detachably coupled to the housing unit; and
wherein the reservoir of the fire suppression system is coupled to the modular attachment and the tubing is configured to detach from the reservoir.

Clause 7. The system of any preceding clause, further comprising:
a power system comprising a rechargeable battery.

Clause 8. The system of any preceding clause, further comprising:
a ventilation system for directing gasses and heat produced during the thermal event from within the housing unit to outside the housing unit.

Clause 9. The system of any preceding clause, further comprising:
a sensor for detecting the thermal event; and
an alarm system in communication with and responsive to the sensor and configured to provide audio and visual signals in response to the sensor detecting the thermal event.

Clause 10. The system of any preceding clause, further comprising:
a sensor for detecting the thermal event; and
a communication system in communication with and responsive to the sensor and configured to transmit a signal to an external device in response to the sensor detecting the thermal event.

Clause 11. The system of any preceding clause, further comprising:
an emergency opening defined by the housing unit and configured to receive the hazardous product;
an emergency bin adjacent to the emergency opening and configured to receive the hazardous product inserted through the emergency opening and store the hazardous product; and
an emergency sensor configured to detect the hazardous product entering the emergency bin.

Clause 12. The system of any preceding clause, further comprising:
a product bin removably disposed within the housing unit for receiving the hazardous product inserted through the product opening, wherein the product bin is configured to store the hazardous product.

Clause 13. The system of any preceding clause, further comprising:
a responder access panel coupled to the housing unit, the responder access panel further comprising:
a fire suppressant port for receiving liquid, fire suppressant, or inert gasses;
a venting port configured to release gasses and heat produced by the thermal event;
a viewing portal for visual inspection of the thermal event; and
a status panel for displaying internal status information for the housing unit.

Clause 14. The system of any preceding clause, further comprising:
a product containment system configured to enclose the hazardous product, wherein the hazardous product is enclosed in an insulated pouch.

Clause 15. The system of any preceding clause, further comprising:
a scanning device for scanning at least one of a product ID tag associated with a product or a customer ID tag associated with a customer to generate scanned information; and
a marking device configured to mark the insulated pouch with the scanned information.

Clause 16. A system for storing a hazardous product, comprising:
a housing unit that defines a product opening;
a fire suppression system for suppressing a thermal event within the housing unit comprising:
a reservoir that contains fire suppression materials; and
tubing disposed along a top of an interior of the housing unit and in fluid communication with the reservoir, wherein the tubing is heat sensitive and configured to breach at a point of high temperature in response to an increase in temperature resulting from the thermal event to distribute the fire suppression materials from the reservoir toward the thermal event.

Clause 17. The system of any preceding clause, further comprising:
the housing unit including a modular attachment that is removable from the housing unit;
wherein the fire suppression system wherein the fire suppression system is coupled to the modular attachment.

Clause 18.The system of any preceding clause, further comprising:
a ventilation system for directing gasses and heat produced during the thermal event from within the housing unit to outside the housing unit.

Clause 19. The system of any preceding clause, further comprising:
a product bin removably disposed within the housing unit for receiving the hazardous product inserted through the product opening, wherein the product bin is configured to store the hazardous product.

Clause 20. A system for storing a hazardous product, comprising:
a housing unit for receiving the hazardous product, wherein the hazardous product has a product ID tag including product information;
a memory device for storing instructions and information;
a scanning device, a sensor, an alarm system, a communication system, and a fire suppression device operatively connected to the housing unit; and
a processing device operatively coupled to the sensor, the scanning device, the memory device, the alarm system, the communication system, and the fire suppression device, wherein the processing device is configured to execute the instructions to:
receive the product information from the scanning device;
store the product information in the memory device;
receive thermal event information from the sensor;
store the thermal event information in the memory device;
determine a thermal event based on the thermal event information;
activate the alarm system in response to the thermal event;
activate the fire suppression device in response to the thermal event; and
transmit, via the communication system, the product information and the thermal event information to an external device.

No part of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

The foregoing description, for purposes of explanation, use specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present invention. Once the above disclosure is fully appreciated, numerous variations and modifications will become apparent to those skilled in the art. It is intended that the following claims be interpreted to embrace all such variations and modifications.

What is claimed is:

1. A system for storing a hazardous product, comprising:
a housing unit defining a product opening;
a product door coupled to the housing unit adjacent to the product opening, wherein, in response to a thermal event, the product door is configured to form a seal with the housing unit about the product opening;
a sensor for detecting the thermal event; and
a ventilation system configured to release gasses and heat produced by the thermal event;
wherein power is supplied wirelessly by the system;
wherein the sensor is configured to detect the thermal event occurring within the housing unit, and the product door is configured to form the seal in response to detecting the thermal event with the sensor; and
wherein the ventilation system is configured to release the gasses and the heat produced by the thermal event from the housing unit.

2. The system of claim 1, further comprising:
a power system including at least one of a battery and an electric power cord.

3. The system of claim 1, further comprising:
a power system including a first electric power supply and a second electric power supply device.

4. The system of claim 1, wherein power is supplied wirelessly by the system, to one or more of the sensor, a solenoid for forming the seal with the door, an actuated valve for controlling release of the gasses with the ventilation system, or a bin configured, removably disposed in the housing unit and configured to receive a hazardous product through the product opening.

5. The system claim 4, further comprising the bin.

6. The system of claim 5, further comprising a plurality of the bins, wherein the housing unit defines a plurality of openings, each of the bins being positioned within the housing unit adjacent to one of the openings to receive hazardous products.

7. The system of claim 1, further comprising:
a communication system configured to transmit a signal to an intermediate communication system configured to communicate with a plurality of systems for storing hazardous products.

8. A system for storing a hazardous product; comprising:
a housing unit defining a product opening;
a product door coupled to the housing unit adjacent to the product opening, wherein, in response to a thermal event the product door is configured to form a seal with the housing unit about the product opening;
a sensor for detecting the thermal event; and
a ventilation system configured to release gasses and heat produced by the thermal event; and
a product bin removably disposed within the housing unit for receiving a hazardous product inserted through the product opening, wherein the product bin is configured to store the hazardous product;
wherein the product bin comprises a product bin sensor for detecting the thermal event,
wherein the sensor is configured to detect the thermal event occurring within the housing unit, and the product door is configured to form the seal in response to detecting the thermal event with the sensor; and
wherein the ventilation system is configured to release the gasses and the heat produced by the thermal event from the housing unit.

9. The system of claim 8, further comprising:
a communication system in communication with and responsive to the sensor and configured to transmit a signal to an external device in response to the sensor detecting the thermal event,
wherein the product bin further comprises a product bin communication system configured to transmit a signal to the communication system in response to the product bin sensor detecting the thermal event.

10. The system of claim 6, wherein the system further comprises a power system, and the product bin includes a remote power system that is configured to receive power wirelessly from the power system.

11. A system for storing a hazardous product, comprising:
a housing unit defining a product opening,
a product door coupled to the housing unit adjacent to the product opening; wherein, in response to a thermal event, the product door is configured to form a seal with the housing unit about the product opening;
a sensor for detecting the thermal event, and
a ventilation system configured to release gasses and heat produced by the thermal event;
a communication system in communication with and responsive to the sensor and configured to transmit a signal to an external device in response to the sensor detecting the thermal event; and
a remote bin for receiving a hazardous product, wherein the remote bin is configured to store the hazardous product, wherein the remote bin comprises a remote bin communication system configured to transmit a signal to the communication system;
wherein the sensor is configured to detect the thermal event occurring within the housing unit, and the product door is configured to form the seal in response to detecting the thermal event with the sensor; and
wherein the ventilation system is configured to release the gasses and the heat produced by the thermal event from the housing unit.

12. The system of claim 11, wherein the remote bin further comprises a remote bin sensor for detecting the thermal event; and wherein the remote bin communication system is configured to transmit a signal to the communication system in response to the remote bin sensor detecting the thermal event.

13. The system of claim 11, wherein the system further comprises a power system, and the remote bin includes a remote power system that is configured to receive power wirelessly from the power system.

14. A system for storing a hazardous product, comprising:
a housing unit defining a product opening:
a product door coupled to the housing unit adjacent to the product opening, wherein, in response to a thermal event, the product door is configured to form a seal with the housing unit about the product opening:
a sensor for detecting the thermal event; and
a ventilation system configured to release gasses and heat produced by the thermal event; and
a fire suppression system for suppressing a thermal event within the housing unit wherein the fire suppression system comprises a reservoir that contains fire suppression materials;
wherein the fire suppression system further comprises:
tubing disposed along a top of an interior of the housing unit and in fluid communication with the reservoir, wherein the tubing is heat sensitive and, in response to an increase in temperature resulting from the thermal event, the tubing is configured to breach at a point of high temperature to distribute the fire suppression materials from the reservoir toward the thermal event;
wherein the sensor is configured to detect the thermal event occurring within the housing unit, and the product door is configured to form the seal in response to detecting the thermal event with the sensor; and
wherein the ventilation system is configured to release the gasses and the heat produced by the thermal event from the housing unit.

15. A system for storing a hazardous product, comprising:
a housing unit defining a product opening,
a product door coupled to the housing unit adjacent to the product opening wherein, in response to a thermal event, the product door is configured to form a seal with the housing unit about the product opening;
a sensor for detecting the thermal event, and
a ventilation system configured to release gasses and heat produced by the thermal event:
a responder access panel coupled to the housing unit, the responder access panel further comprising:
a fire suppressant port for receiving at least one of liquid, fire suppressant, and inert gasses;
a viewing portal for visual inspection of the thermal event; and
a status panel for displaying internal status information for the housing unit;
wherein the sensor is configured to detect the thermal event occurring within the housing unit, and the product door is configured to form the seal in response to detecting the thermal event with the sensor; and
wherein the ventilation system is configured to release the gasses and the heat produced by the thermal event from the housing unit.

16. A system for storing a hazardous product, comprising:
a communication system;
a remote bin comprising:
a housing unit defining a product opening for receiving the hazardous product, wherein the housing unit is configured to store the hazardous product; and
a remote bin communication system configured to transmit a signal to the communication system; and
tubing disposed along a top of an interior of the housing unit and in fluid communication with the reservoir, wherein the tubing is heat sensitive and, in response to an increase in temperature resulting from the thermal event, the tubing is configured to breach at a point of high temperature to distribute the fire suppression materials from the reservoir toward the thermal event:
wherein the remote bin further comprises a remote bin sensor for detecting a thermal event:
wherein the remote bin communication system is configured to transmit a signal to the communication system in response to the remote bin sensor detecting the thermal event; and
wherein the remote bin further comprises a fire suppression system for suppressing a thermal event within the housing unit; wherein the fire suppression system comprises a reservoir that contains fire suppression materials.

17. The system of claim 16, wherein the remote bin further comprises:
an alarm system in communication with and responsive to the communication system and configured to provide at least one of audio and visual signals in response to the remote bin sensor detecting the thermal event.

18. The system of claim 16, wherein the remote bin further comprises: a ventilation system for directing gasses and heat produced during the thermal event from within the housing unit to outside the housing unit.

19. The system of claim 16, further comprising a second housing unit having the communication system, being configured to receive a second bin, and having a, wherein each of the remote bin and the second bin are configured to receive and store hazardous products.

20. The system of claim 19, wherein the second housing unit includes an alarm system in communication with the communication system, and the remote communication system is in communication with the communication system to activate the alarm system.

* * * * *